ENERGIZING CIRCUIT FOR DEGAUSSING APPARATUS

Filed May 3, 1966

INVENTOR.
RONALD R. NORLEY
BY
W. H. Spouagle
Attorney

United States Patent Office 3,324,344
Patented June 6, 1967

3,324,344
ENERGIZING CIRCUIT FOR DEGAUSSING APPARATUS

Ronald R. Norley, Indianapolis, Ind., assignor to Radio Corporation of America, a corporation of Delaware Filed May 3, 1966, Ser. No. 547,212
10 Claims. (Cl. 315—8)

Figures 1, 2:
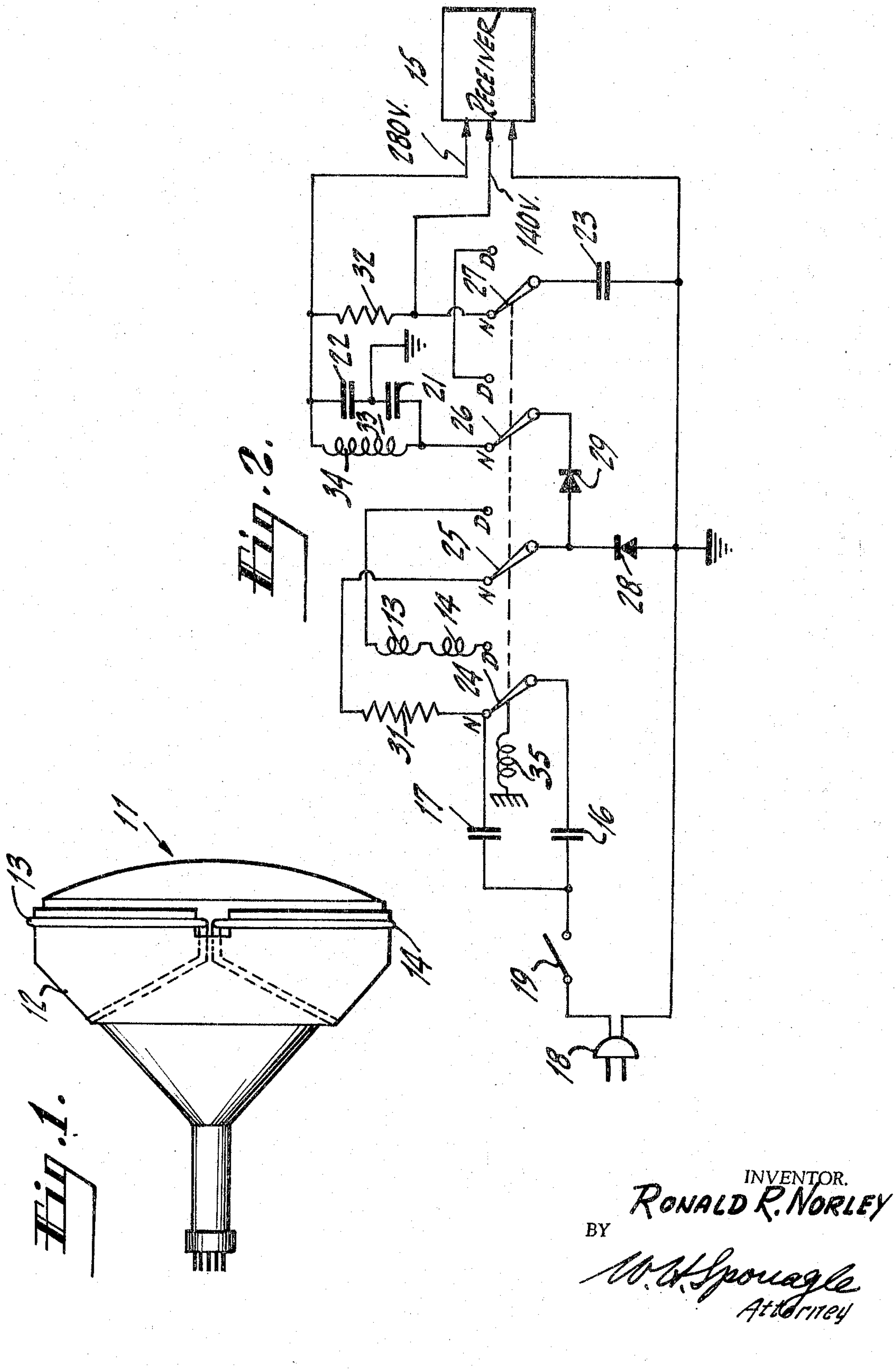

This invention relates to the degaussing apparatus used in color television receivers and particularly to a control circuit for energizing the coil structure of such apparatus.

In a shadow mask type of color picture tube, the metallic mask and its supporting structure together with other metallic parts of the tube are subject to being magnetized in various ways such as in shipment to, and continued use in a consumer's home. Such undesired magnetization is caused by bringing the picture tube into proximity with magnetizing fields associated with structures such as trucks, elevators and the like and also by exposure during use to influences such as the earth's magnetic field. Such random magnetization often adversely affects the performance of a color television receiver in which the picture tube is embodied.

The remedy for such magnetization is either a degaussing of the apparatus by a skilled serviceman or by the provision of suitable apparatus such as in some receivers manufactured in recent years. Relocation or reorientation of the apparatus in a consumer's home also frequently requires degaussing of the apparatus in order to effect optimum performance in the new position. Such a function is performed automatically in some of the more recently produced receivers.

Automatic degaussing of a color television picture tube usually is accomplished by providing a coil structure suitably placed relative to the picture tube so that the field produced thereby encompasses the shadow mask and its supporting structure in the picture tube. Such a coil structure is energized by alternating current which initially has a substantial magnitude, but which subsequently is gradually diminished to a relatively low magnitude. Circuits for energizing such a coil structure in many of the receivers recently produced employ components such as thermistors and varistors so as to automatically disconnect the coil structure from the source of alternating current after the energizing current reaches its relatively low magnitude. Such circuits have generally proved to be satisfactory although the energizing current is limited to a certain extent by the use of the described components. The nature of these circuits, also, is such that a cooling off period of at least 5 minutes is required in order that they be completely effective when the receiver is next switched on. This latter limitation is particularly disadvantageous in portable color television receivers where the location and/or orientaiton of the receiver is subject to frequent change.

An object of the present invention, therefore, is to provide an improved circuit for energizing the degaussing apparatus of a color television receiver.

In accordance with this invention, the degaussing coil is connected between two capacitors in a voltage doubler arrangement in which one capacitor is charged by alternating current of one polarity flowing in one direction through the coil and is discharged into the second capacitor by alternating current of opposite polarity flowing in the opposite direction through the coil. The charging and discharging currents decrease in magnitude in successive cycles of the alternating current, becoming substantially zero when the second capacitor is charged to a potental which is approximately double the peak voltage of the alternating current.

According to one feature of the invention, the two capacitors are part of a voltage doubler direct current power supply for the television receiver and also includes a pair of diodes and a filter. The diodes are connected in the circuit in a manner to charge and discharge the capacitors as described. A switch, in a normal operating position, connects the filter in the power supply circuit and effectively disconnects the degaussing coil therefrom. In a degaussing position, the switch effectively disconnects the power supply circuit from the rest of the receiver and places the degaussing coil in the capacitor charging and discharging circuit.

For a better understanding of the invention, reference now will be made to the following description which is taken in conjunction with the accompanying drawing, of which:

FIGURE 1 is a view of a color television picture tube provided with a typical degaussing apparatus; and FIGURE 2 is a schematic circuit diagram of the apparatus in accordance with the invention by which the coil structure of the degaussing apparatus is energized.

In FIGURE 1 the color picture tube 11 is provided with a magnetic shield 12 made of ferrous metal. This shield is mounted so that it surrounds the picture tube in the region in which the shadow mask and its supporting structure is located. A pair of coils 13 and 14 is mounted on the shield 12 substantially in the manner shown so that the forward portions of the coils encircle the shield 12 on the outside and the rear portions of the coils are disposed on the inside of the shield. It is to be understood that the energizing circuit of the invention is not limited to use with the particular configuration of the shield 12 and the coils 13 and 14 chosen herein for illustration. Other shield configurations and coil structures may be used in conjunction with the present invention.

FIGURE 2 shows schematically the degaussing coils 13 and 14 connected in the low voltage power supply circuit for a color television receiver 15. It will be understood that the receiver 15 includes all of the apparatus and circuit components such as electron tubes or equivalent devices for producing a color television picture on an image reproducing device such as the color picture tube 11 of FIGURE 1. The low voltage power supply is a voltage doubler arrangement in which a first capacitance, in the form of the parallel arrangement of capacitors 16 and 17, is charged on alternate half cycles of alternating current derived from a source represented by a connecting plug 18 through a closed switch 19 and is discharged on alternate half cycles of the other polarity into a capacitance represented by filter capacitors 21 and 22 and a capacitor 23.

The apparatus functions as a power supply for the receiver 15 when switches 24, 25, 26 and 27 are in their normal operating positions N as shown. The power supply also includes a pair of diodes 28 and 29 connected in the circuit in such a manner that, on half cycles of alternating current of one polarity, the capacitors 16 and 17 are charged through a circuit which includes the switch 25 and its N contact, current limiting resistor 31, the switch 24 and its N contact and the closed switch 19. On alternate half cycles of the alternating current of the opposite polarity the capacitors 16 and 17 are discharged into capacitors 21, 22 and 23 through a circuit which includes switches 24 and 25 and their N contacts, resistor 31, diode 29, switch 26 and its N contact, a resistor 32 and switch 27 and its N contact. The two shunt capacitors 21 and 22 form part of a filter 33 which also includes a series inductor 34. The low voltage power supply functions as described to convert alternating current of nominal 115 volts R.M.S. into a direct voltage of approximately 280 volts which is supplied to the receiver 15. A connection from the resistor 32 also supplies a direct voltage of approximately 140 volts to the receiver.

From the foregoing description it is seen that the low voltage power supply for the receiver 15 is a conventional voltage doubler type of circuit. When it is desired to perform a degaussing operation on the picture tube 11 and any adjacent metallic structures, the switches 24, 25, 26 and 27, which are mechanically interconnected as indicated, are operated to their respective D contacts against the biasing action of a retractile spring 35. The ends of the spring 35 are attached mechanically, but not electrically, respectively to the switches 24, 25, 26 and 27 and to some fixed point as indicated. The power supply is disconnected from the receiver 15 by the switch 26 and capacitor 23 is substituted for capacitor 21 by the switch 27. Also, the switches 24 and 25 disconnect the capacitor 17 and the current limiting resistor 31 from the circuit and connect in its place the degaussing coils 13 and 14. The capacitor 16 is charged through the diode 28 on half cycles of alternating current of one polarity by current flowing in one direction through the degaussing coils 13 and 14. On alternate half cycles of the alternating current of the other polarity, the capacitor 16 is discharged through the diode 29 into the capacitor 23 by current flowing in the opposite direction through the degaussing coils 13 and 14.

As the capacitor 23 is charged toward a voltage which is approximately twice the peak voltage of the alternating current, the charging and discharging currents through the degaussing coils 13 and 14 decrease cyclically to substantially zero when the capacitor 23 becomes fully charged. Thus, it is seen that, by means of the voltage doubler type of operation between the capacitors 16 and 23, there is produced the cyclical reversal with diminishing amplitude of current flow through the degaussing coils 13 and 14 which is needed in order to effect the desired degaussing of the picture tube 11.

The described degaussing opration rquires only a comparatively small number of cycles of the alternating current and is accomplished in a very short space of time. The time required is no more than that needed to operate the switches 24, 25, 26 and 27 from their N to their D contacts and to release them for return to their N contacts by the retractile spring 35. As soon as the switches are returned to their normal operating contacts N, the voltage across the capacitor 23 very quickly returns to a normal value of about 140 volts. If desired, the degaussing operation may be repeated immediately because there are no temperature responsive components in the circuit which require cooling before the operation can be repeated as in some of the prior art arrangements.

Because the circuit components utilized in the degaussing circuit are also used in the normal low voltage power supply for the receiver, it has been found expedient to constitute the capacitance represented by the capacitors 16 and 17 as separate units in order to improve the degaussing operation. Normally, for example, the capacitors 21 and 22 have nominal values of 150 microfarads, the capacitor 23 has a typical nominal value of 100 microfarads and the capacitance represented by the capacitors 16 and 17 has a typical nominal value of 300 microfarads. A capacitance of 300 microfarads discharging into a capacitance of from 100 to 150 microfarads through the degaussing coils 13 and 14 would cause a somewhat unsymmetrical alternating current to traverse these coils. In order to effect a symmetrical alternating current flow through coils 13 and 14, in one successfully operated embodiment of the invention, the capacitor 16 had a nominal value of 50 microfarads and the capacitor 17 had a nominal value of 250 microfarads. This provides a capacitor of 300 microfarads for alternate charging and discharging into the capacitors 21, 22 and 23 of the typical values described when the apparatus operates as a low voltage power supply for the receiver 15. Also, in a degaussing operating condition of the circuit, a nominal capacitance of 50 microfarads is alternately charged and discharged through the degaussing coils 13 and 14 into a nominal capacitance of 100 microfarads.

In the described apparatus, the capacitors are electrolytic types which have the usual tolerances of +100% and −10% of their nominal values. It will be understood, therefore, that the term "nominal" as used in the foregoing description and in the following claims with reference to the capacitors is intended to designate values subject to the indicated tolerances. For example, the capacitor 16 having a nominal value of 50 microfarads may have an actual value within a range from 45 to 100 microfarads Similarly, the capacitor 23 having a nominal value of 100 microfarads may have an actual value within a range from 90 to 200 microfarads. The circuit embodying the invention operates satisfactorily with such capacitors as described.

What is claimed is:

1. In a television receiver embodying a picture tube and a degaussing coil mounted in such relation to said picture tube as to produce, when energized, an alternating magnetic field of diminishing magnitude within said tube, apparatus for energizing said coil, comprising:
- a source of alternating current;
- first and second capacitors coupled respectively to opposite terminals of said coil;
- first circuit means operative on half cycles of one polarity of said alternating current for charging said first capacitor from said source of alternating current with current of one polarity through said coil; and
- second circuit means operative on half cycles of opposite polarity of said alternating current for discharging said first capacitor into said second capacitor with current of opposite polarity through said coil.

2. In a television receiver, apparatus for energizing a degaussing coil as defined in claim 1 wherein:
- said first circuit means includes a first diode connected in one polarity to one terminal of said coil; and
- said second circuit means includes a second diode connected in opposite polarity to said one coil terminal.

3. In a television receiver, apparatus for energizing a degaussing coil as defined in claim 2 wherein:
- said first capacitor has a nominal value approximately one-half the nominal value of said second capacitor, whereby said charging and discharging currents through said coil are approximately equal and of magnitudes cyclically diminishing to substantially zero as said capacitors become charged to substantially the same potential.

4. In a television receiver, apparatus for energizing a degaussing coil as defined in claim 3 wherein:
- said first and second capacitors and said first and second diodes function in normal operation as a voltage doubler type of direct current power supply for said receiver;
- means including a first switch operative in a normal operating position to effectively disconnect said degaussing coil; and
- means including a second switch operative in a normal operating position to connect said second capacitor to said receiver.

5. In a television receiver, apparatus for energizing a degaussing coil as defined in claim 4 wherein:
- said direct current power supply includes a filter; and
- means including a third switch operative in a normal position to connect said filter between said second diode and the power supply output to said receiver.

6. In a television receiver, apparatus for energizing a degaussing coil as defined in claim 5 wherein said apparatus also includes:
- a third capacitor; and
- means including said first switch operative in said normal operating position to connect said third capacitor in parallel with said first capacitor.

7. In a television receiver, apparatus for energizing a degaussing coil as defined in claim 6 wherein said apparatus also includes:

a current-limiting resistor connected to said third capacitor; and means including a fourth switch operative in a normal operating position to connect said resistor in series with said first and second diodes.

8. In a television receiver, apparatus for energizing a degaussing coil as defined in claim 7 wherein:

said first and fourth switches are operative in their respective degaussing positions to disconnect said third capacitor from said parallel arrangement with said first capacitor, to disconnect said resistor from said diodes, and to connect said degaussing coil in series between said first capacitor and said diodes.

9. In a television receiver, apparatus for energizing a degaussing coil as defined in claim 8 wherein:

said third switch is operative in its degaussing position to disconnect said power supply from said receiver; and said second and third switches are operative in their respective degaussing positions to connect said second capacitor directly to said second diode.

10. In a television receiver, apparatus for energizing a degaussing coil as defined in claim 9 wherein:

said first, second, third and fourth switches are mechanically interconnected for actuation simultaneously from their respective normal positions to their respective degaussing positions; and retractile biasing means to restore said first, second, third and fourth switches to their respective normal positions upon release from said actuation.

No references cited.

JAMES W. LAWRENCE, *Primary Examiner.*

V. LAFRANCHI, *Assistant Examiner.*